US011312792B2

(12) United States Patent
Suk-Em et al.

(10) Patent No.: US 11,312,792 B2
(45) Date of Patent: *Apr. 26, 2022

(54) MULTIMODAL POLYETHYLENE CONTAINER

(71) Applicants: Thai Polyethylene Co., Ltd., Bangkok (TH); SCG Chemicals Co., Ltd., Bangkok (TH)

(72) Inventors: Chatdao Suk-Em, Bangkok (TH); Natthaporn Suchao-In, Bangkok (TH); Watcharee Cheevasrirungruang, Bangkok (TH); Warachad Klomkamol, Bangkok (TH); Boonyakeat Thitisak, Bangkok (TH)

(73) Assignees: Thai Polyethylene Co., Ltd., Bangkok (TH); SCG Chemicals Co., Ltd., Bangkok (TH)

( * ) Notice: Subject to any disclaimer, the term of this patent is extended or adjusted under 35 U.S.C. 154(b) by 401 days.

This patent is subject to a terminal disclaimer.

(21) Appl. No.: 16/332,065

(22) PCT Filed: Sep. 11, 2017

(86) PCT No.: PCT/EP2017/072682
§ 371 (c)(1),
(2) Date: Mar. 11, 2019

(87) PCT Pub. No.: WO2018/046711
PCT Pub. Date: Mar. 15, 2018

(65) Prior Publication Data
US 2019/0359738 A1 Nov. 28, 2019

(30) Foreign Application Priority Data

Sep. 12, 2016 (EP) ..................... 16188343

(51) Int. Cl.
| | |
|---|---|
| C08F 2/01 | (2006.01) |
| B29D 22/00 | (2006.01) |
| C08F 2/14 | (2006.01) |
| C08F 110/02 | (2006.01) |
| C08F 210/16 | (2006.01) |
| C08L 23/06 | (2006.01) |
| C08L 23/08 | (2006.01) |

(52) U.S. Cl.
CPC .............. *C08F 2/01* (2013.01); *B29D 22/003* (2013.01); *C08F 2/14* (2013.01); *C08F 110/02* (2013.01); *C08F 210/16* (2013.01); *C08L 23/06* (2013.01); *C08L 23/0815* (2013.01); *C08F 2400/02* (2013.01); *C08L 2203/10* (2013.01); *C08L 2205/025* (2013.01); *C08L 2205/03* (2013.01); *C08L 2207/068* (2013.01); *C08L 2314/02* (2013.01); *C08L 2314/06* (2013.01)

(58) Field of Classification Search
USPC .................................................. 526/65, 905
See application file for complete search history.

(56) References Cited

U.S. PATENT DOCUMENTS

| | | | | |
|---|---|---|---|---|
| 3,210,271 | A | * | 10/1965 | Byerly ................... B01D 3/143 208/355 |
| 6,291,601 | B1 | | 9/2001 | Debras |
| 6,713,561 | B1 | | 3/2004 | Berthold et al. |
| 6,716,936 | B1 | | 4/2004 | McGrath et al. |
| 8,759,448 | B2 | | 6/2014 | Buryak et al. |
| 8,802,768 | B2 | | 8/2014 | Dotsch et al. |
| 8,987,390 | B2 | * | 3/2015 | Bhandarkar ............ C08F 10/02 526/65 |
| 10,919,991 | B2 | * | 2/2021 | Jarumaneeroj ....... C08F 210/16 |
| 2003/0191251 | A1 | | 10/2003 | McGrath |
| 2004/0204542 | A1 | | 10/2004 | Mattioli et al. |
| 2006/0074193 | A1 | * | 4/2006 | Berthold ............ C08F 297/086 525/240 |
| 2006/0074194 | A1 | | 4/2006 | Berthold et al. |
| 2009/0105422 | A1 | | 4/2009 | Berthold et al. |
| 2009/0163679 | A1 | | 6/2009 | Do Nascimento et al. |
| 2009/0304966 | A1 | | 12/2009 | Mehta et al. |
| 2010/0010163 | A1 | | 1/2010 | Berthold et al. |
| 2010/0016526 | A1 | | 1/2010 | Etherton et al. |
| 2010/0035008 | A1 | | 2/2010 | Backman |
| 2010/0092709 | A1 | | 4/2010 | Joseph |
| 2010/0152383 | A1 | | 6/2010 | Jiang et al. |
| 2010/0301054 | A1 | | 12/2010 | Berthold et al. |

(Continued)

FOREIGN PATENT DOCUMENTS

| | | |
|---|---|---|
| EP | 1041113 A1 | 10/2000 |
| EP | 1201713 A1 | 5/2002 |
| EP | 1460105 A1 | 9/2004 |
| EP | 1417260 B1 | 8/2005 |
| EP | 1578862 B1 | 9/2005 |
| EP | 1655334 A1 | 5/2006 |
| EP | 1576047 B1 | 7/2006 |
| EP | 1576049 B1 | 7/2006 |
| EP | 2017302 A1 | 1/2009 |
| EP | 2130863 A1 | 12/2009 |
| EP | 2354184 A1 | 8/2011 |
| EP | 2407506 A1 | 1/2012 |
| EP | 2365995 B1 | 12/2012 |

(Continued)

OTHER PUBLICATIONS

Dec. 21, 2017—ISR and WO PCT/EP2017/072682.

*Primary Examiner* — Fred M Teskin
(74) *Attorney, Agent, or Firm* — Banner & Witcoff, Ltd.

(57) ABSTRACT

The present invention relates to a reactor system for a multimodal polyethylene polymerization process, comprising; (a) a first reactor; (b) a hydrogen removal unit arranged between the first reactor and a second reactor comprising at least one vessel connected with a depressurization equipment, preferably selected from vacuum pump, compressor, blower, ejector or a combination thereof, the depressurization equipment allowing to adjust an operating pressure to a pressure in a range of 100-200 kPa (abs); (c) the second reactor; and (d) a third reactor and the use thereof as a container.

20 Claims, No Drawings

(56) References Cited

U.S. PATENT DOCUMENTS

| | | | |
|---|---|---|---|
| 2013/0018154 A1* | 1/2013 | Buryak | C08L 23/04 |
| | | | 525/240 |
| 2014/0030460 A1 | 1/2014 | Monoi et al. | |
| 2015/0051364 A1 | 2/2015 | Vahteri et al. | |
| 2019/0225714 A1* | 7/2019 | Jarumaneeroj | C08L 23/04 |
| 2019/0359741 A1* | 11/2019 | Suchao-In | B01D 19/0036 |

FOREIGN PATENT DOCUMENTS

| | | |
|---|---|---|
| EP | 2743305 A1 | 6/2014 |
| EP | 2668231 B1 | 10/2014 |
| EP | 2907843 A1 | 8/2015 |
| HU | 0800771 A2 | 10/2010 |
| JP | 2012-067914 A | 4/2012 |
| WO | 9618677 A1 | 6/1996 |
| WO | 2004056921 A1 | 7/2004 |
| WO | 2006092377 A1 | 9/2006 |
| WO | 2006092378 A1 | 9/2006 |
| WO | 2006092379 A1 | 9/2006 |
| WO | 2007003530 A1 | 1/2007 |
| WO | 2007042216 A1 | 4/2007 |
| WO | 2007045415 A1 | 4/2007 |
| WO | 2008006487 A1 | 1/2008 |
| WO | 2008049551 A1 | 5/2008 |
| WO | 2008131817 A1 | 11/2008 |
| WO | 2009003627 A1 | 1/2009 |
| WO | 2009077142 A1 | 6/2009 |
| WO | 2009147022 A1 | 12/2009 |
| WO | 2010025342 A2 | 3/2010 |
| WO | 2012069400 A1 | 5/2012 |
| WO | 2013101767 A2 | 7/2013 |
| WO | 2013113797 A1 | 8/2013 |
| WO | 2013144324 A1 | 10/2013 |
| WO | 2013144328 A1 | 10/2013 |
| WO | 2014091501 A1 | 6/2014 |
| WO | 2015121161 A1 | 8/2015 |

* cited by examiner

MULTIMODAL POLYETHYLENE CONTAINER

CROSS-REFERENCE TO RELATED APPLICATIONS

This application is a U.S. National Stage application under 35 U.S.C. § 371 of International Application PCT/EP2017/072682 (published as WO 2018/046711 A1), filed Sep. 11, 2017, which claims the benefit of priority to Application EP 16188343.4, filed Sep. 12, 2016. Benefit of the filing date of each of these prior applications is hereby claimed. Each of these prior applications is hereby incorporated by reference in its entirety.

The present invention relates to a reactor system for a multimodal polyethylene polymerization process, a process for producing a multimodal polyethylene composition using said reactor system, a multimodal polyethylene composition obtainable this way and a container prepared therefrom.

The demand of polyethylene resins is increasingly being used in a variety of applications. As required high performance of polyethylene for a relatively new plastic, a polymerization process technology has been developed to support new polymeric material production. In order for balancing processability and physical properties of ethylene copolymers, the development in multimodal polymerization process has been investigated.

In the prior art, multimodal polyethylene polymerization is employed to produce polymers having different molecular weights by creating each resin fraction in separated reactors. A low molecular weight fraction is produced in a reactor using an excess of hydrogen to control the molecular weight of the polymer suitable for providing good processability of the final polymer. A high molecular weight fraction which has an influence on the physical properties and is produced under polymerization conditions with low hydrogen concentration. It is well known in the art that low molecular weight polymer is preferably produced in a first reactor. To obtain a multimodal polymer with good physical properties, all hydrogen from the first reactor should be removed before the polymerized slurry polymer is passed to a second reactor in which the production of high molecular weight polymer takes place.

US2010/0092709 A1 describes a process for preparing bimodal polyethylene copolymers. The polymerization in a second reactor is operated at a high temperature with a low comonomer-to-ethylene-ratio and low hydrogen-to-ethylene-ratio to obtain resins having improved stress crack resistance and melt strength.

U.S. Pat. No. 6,716,936 B1 describes a process for producing bimodal polyethylene copolymers. A second reactor is operated under hydrogen depleted polyethylene polymerization by directing a polyethylene slurry stream from a first reactor to a hydrogen removal system. Polymerization in both the first and the second reactors is operated at the bubble point by using propane or isobutane as a light solvent. The process is suitable for the production of a bimodal polyethylene for highly homogeneous high molecular weight resins.

U.S. Pat. No. 6,291,601 B1 describes a process for producing a bimodal copolymer with relatively high molecular weight polyethylene. A hydrogenation catalyst is introduced into a second reactor to consume residual hydrogen gas from first reactor by converting hydrogen into ethane leading to a low hydrogen concentration in the second reactor. Using this technique, the cost of raw material consumption of both hydrogen and ethylene are increased due to converting of unreacted gases.

US 2003/0191251 A1 discloses a process for removing residual hydrogen from a polymer slurry by using two flash drums placed between cascade reactors which use light solvent as a diluent. The addition of make-up solvent to the first flash drum outlet is required to prevent a slurry transfer pump blocking. Furthermore, warm make-up solvent is necessary before transferring slurry into the next flash drum.

EP 1 655 334 A1 discloses the multimodal production of an ethylene polymer which is produced in a multistage process with a $MgCl_2$-based Ziegler-Natta catalyst. The polymerization stages are performed in the following order to achieve firstly a ultra high molecular weight polymer, followed by achieving a low molecular weight polymer, and finally achieving high molecular weight polymer in the last step. The polymerization catalyst is charged to a prepolymerization step to make an ultrahigh molecular weight fraction.

WO 2013/144328 describes a composition of multimodal high density polyethylene which is produced using a Ziegler-Natta catalyst for use in molding applications. A small fraction of ultra-high polyethylene of less than 15% by weight is produced in a third reactor.

US 2009/0105422 A1 describes a process for producing a multimodal polyethylene. The polymerization is carried out in three cascade reactors, wherein the molecular weight of the polymer in each reactor is controlled by the presence of hydrogen. The concentration of the hydrogen in each reactor is reduced subsequently by providing the highest hydrogen concentration in the first reactor and the lowest hydrogen concentration in the third reactor.

WO 2013/113797 describes a process for polyethylene preparation comprising three main subsequent steps of polymerized ethylene and at least one other α-olefin to get the polyethylene with, respectively, a lower molecular weight ethylene polymer, a first higher molecular weight ethylene polymer and a second higher molecular weight ethylene polymer in accordance with the sequence of a first reactor, a second reactor and a third reactor.

Even though many processes for preparing multimodal polyethylene are known and have been described, there is still a need for developing new processes for multimodal polymerization, particularly for further improving the mechanical properties of polyethylene compositions.

Therefore, it is the object of the present invention to provide a reactor system and a process for preparing multimodal polyethylenes overcoming drawbacks of the prior art, in particular to enhance the performance of a hydrogen removal unit comprised in such a reactor.

It is an further object to provide a multimodal polyethylene composition overcoming drawbacks of the prior art, in particular having improved mechanical properties, such as Charpy impact strength.

A lot of different polymer containers are well-known in the art. The size of such containers reaches from a volumetric capacity of several mL to several thousands of liters. The smallest respective containers are the so-called conventional containers, for example for storing tooth paste, shampoo, liquid soap etc. The size of these conventional containers is generally from 0.25 L to 10 L. Also well-known in the art are so-called jerry cans, having a size of about 10 to 40 liters, particularly for storing gasoline. Another example of containers known in the art, having a size of about 40 to 120 liters, are fuel tanks. Furthermore, open top and L-ring containers, having a volume of about 120 to 500 liter are also known in the art, just as intermediate bulk containers which may have a size of 1,000 liters and more.

US 2014/0030460 A1 is related to an ethylene-based polymer and preparing a moulded hollow plastic container therefrom. The polymer comprises different polymers of specific properties.

EP 2 668 231 B1 is related to a multimodal polyethylene composition. Further disclosed is the use of the composition for blow molding to produce a number of household and industrial containers.

U.S. Pat. No. 8,802,768 B2 discloses a multimodal polymer composition and the use thereof for blow molding. This disclosure particularly refers to containers having a volume of about 100 to 200 L.

US 2010/0301054 A1 is related to a polyethylene molding composition for producing hollow containers by thermoforming and fuel containers produced therewith. The containers are mentioned to have a size of about 20 to 200 L.

WO 2012/069400 A1 is related to a trimodal polyethylene for use in blow molding. Disclosed therein is the preparation of a variety of containers having a size from 10 to 150 L.

EP 1 576 049 B1 discloses a polyethylene composition for producing L-ring drums. The drums prepared this way have a capacity in a range from 50 to 250 L, i.e. are so-called middle-size containers.

EP 1 576 047 B1 shows a polyethylene blow molding composition for producing small containers having a capacity from 200 to 5.000 ml.

EP 1 578 862 B1 is related to a polyethylene blow molding composition for producing jerry cans. The jerry cans have a size of 2 to 20 L, i.e. are so-called small-size containers.

WO 2009/003627 A1 discloses a polyethylene molding composition for blow molding of small low density blow moldings and the preparation of containers having a volume of 250 to 5,000 ml.

Blow molded containers gradually trend to replace metal containers with more severe service condition. Therefore, the development of the polyethylene composition that have been improved the mechanical properties (impact resistance, stiffness, ESCR) as well as processability (degree of swelling, melt strength) is essential.

It is therefore the object of the present invention to provide polyethylene compositions for producing containers and containers obtainable this way overcoming drawbacks of the prior art. In particular, it is the objective of this invention to formulate a polyethylene composition that has most suitable mechanical properties and processing behavior for producing hollow containers with a volume between 0.25-2000 liters by extrusion blow molding or thermoforming process. The polymer composition of the invention provides more superior mechanical strength over the prior art. Besides, the invention gives a higher swelling ratio than other previous multimodal technology. In conclusion, the polyethylene composition of this invention provides an excellent balance between mechanical properties and processing behavior over the polymer form the prior arts.

This object is achieved in accordance with the invention according to the subject-matter of the independent claims. Preferred embodiments result from the sub-claims.

The object is first of all achieved by a reactor system for a multimodal polyethylene polymerization process, comprising;
(a) a first reactor,
(b) a hydrogen removal unit arranged between the first reactor and a second reactor comprising at least one vessel connected with a depressurization equipment, preferably selected from vacuum pump, compressor, blower, ejector or a combination thereof, the depressurization equipment allowing to adjust an operating pressure to a pressure in a range of 100-200 kPa (abs);
(d) the second reactor, and
(e) a third reactor.

Preferably, the depressurization equipment allows to adjust the operating pressure in the hydrogen removal unit to a pressure in the range of 103-145 kPa (abs), preferably 104-130 kPa (abs), most preferably 105 to 115 kPa (abs)

Preferably, the hydrogen removal unit further contains a stripping column for the separation of hydrogen and a liquid diluent.

The object is further achieved by a process for producing a multimodal polyethylene composition in the reactor system according to any of the claims 1 to 3, comprising; polymerizing ethylene in an inert hydrocarbon medium in the first reactor in the presence of a catalyst system, selected from Ziegler-Natta catalyst or Metallocene, and hydrogen in an amount of 0.1-95% by mole with respect to the total gas present in the vapor phase in the first reactor to obtain a low molecular weight polyethylene having a weight average molecular weight (Mw) of 20,000 to 90,000 g/mol or medium molecular weight polyethylene having a weight average molecular weight (Mw) of more than 90,000 to 150,000 g/mol wherein the low molecular weight polyethylene, respectively the medium molecular weight polyethylene, has a density at least 0.965 g/cm3, and the low molecular weight polyethylene has MI2 in the range from 10 to 1,000 g/10 min and the medium molecular weight polyethylene has MI2 in the range from 0.1 to 10 g/10 min.

(a) removing in the hydrogen removal unit 98.0 to 99.8% by weight of the hydrogen comprised in a slurry mixture obtained from the first reactor at a pressure in the range of 103-145 kPa (abs) and transferring the obtained residual mixture to the second reactor;

(b) polymerizing ethylene and optionally C4-12 α-olefin comonomer in the second reactor in the presence of a catalyst system, selected from Ziegler-Natta catalyst or metallocene, and in the presence of hydrogen in an amount obtained in step (b) to obtain a first high molecular weight polyethylene having a weight average molecular weight (Mw) of more than 150,000 to 1,000,000 g/mol or a first ultra high molecular weight polyethylene in the form of a homopolymer or a copolymer having a weight average molecular weight (Mw) of more than 1,000,000 to 5,000,000 g/mol and transferring a resultant mixture to the third reactor, and (c) polymerizing ethylene, and optionally C4-12 α-olefin comonomer in the third reactor in the presence of a catalyst system, selected from Ziegler-Natta catalyst or metallocene, and hydrogen, wherein the amount of hydrogen in the third reactor is in a range of 0.1-70% by mol, preferably 0.1-60% by mol, with respect to the total gas present in the vapor phase in the third reactor or optionally substantial absence of hydrogen to obtain a second high molecular weight polyethylene having a weight average molecular weight (Mw) of more than 150,000 to 1,000,000 g/mol or a second ultra high molecular weight polyethylene homopolymer or copolymer having a weight average molecular weight (Mw) of more than 1,000,000 to 5,000,000 g/mol.

"Substantially absence" in this regard means that hydrogen is only comprised in the third reactor in an amount which cannot be avoided by technical means.

The slurry mixture obtained from the first reactor and subjected to the step of removing hydrogen in the hydrogen removal unit contains all of the solid and liquid constituents obtained in the first reactor, in particular the low molecular weight polyethylene or the medium molecular weight polyethylene. Furthermore, the slurry mixture obtained from the first reactor is saturated with hydrogen regardless the amount of hydrogen used in the first reactor.

Preferably, the removing is removing of 98.0 to 99.8% by weight of the hydrogen, and more preferable 98.0 to 99.5% by weight, most preferred 98.0 to 99.1% by weight.

Preferably, the operation pressure in the hydrogen removal unit is in the range of 103-145 kPa (abs) and more preferably 104-130 kPa (abs), most preferred 105 to 115 kPa (abs).

Preferably, step (a) results in the low molecular weight polyethylene or medium molecular weight polyethylene, step (c) results in high molecular weight polyethylene or the ultra high molecular weight polyethylene, and step (d) results in high molecular weight polyethylene or the ultra high molecular weight polyethylene.

The weight average molecular weight (Mw) of the low molecular weight polyethylene, the medium molecular weight polyethylene, the high molecular weight polyethylene and the ultra high molecular weight polyethylene described herein are in the range of 20,000-90,000 g/mol (low), more than 90,000-150,000 g/mol (medium), more than 150,000-1,000,000 g/mol (high) and more than 1,000,000-5,000,000 g/mol (ultra high) respectively.

Moreover, the object is achieved by a multimodal polyethylene composition obtainable by a process according to any one of claims 4 to 6, comprising;
(A) 30 to 65 parts by weight, preferably 40 to 65 parts by weight, preferably 40 to 55 parts by weight, most preferred 45 to 52 parts by weight, of the low molecular weight polyethylene having a weight average molecular weight (Mw) of 20,000 to 90,000 g/mol;
(B) 10 to 40 parts by weight, preferably 10 to 30 parts by weight, most preferred 12 to 25 parts by weight, of the first high molecular weight polyethylene having a weight average molecular weight (Mw) of more than 150,000 to 1,000,000 g/mol or the first ultra high molecular weight polyethylene having a weight average molecular weight (Mw) of more than 1,000,000 to 5,000,000 g/mol; and
(C) 10 to 50 parts by weight, preferably 25 to 45 parts by weight, most preferred 30 to 40 parts by weight, of the second high molecular weight polyethylene having a weight average molecular weight (Mw) of more than 150,000 to 1,000,000 g/mol or the second ultra high molecular weight polyethylene having a weight average molecular weight (Mw) of more than 1,000,000 to 5,000,000 g/mol.

Preferably, the multimodal polyethylene composition has a swelling ratio at shear rate 1400 1/sec determined at temperature of 190° C. in a circular length 0.25 mm orifice die 2 mm diameter and entrance angle by 45° of at least 170%, preferably from 180 to 250%, more preferred 185 to 240%, and has a FNCT at 80° C., 3.5 MPa with the environment of 2% solution of Arkopal from 10 to 270 hours, preferably from 12 to 250 hours, more preferred 12 to 240 hours.

The object is further achieved by a multimodal polyethylene composition comprising:
(A) 40 to 65 parts by weight, preferably 40 to 55 parts by weight, most preferred 45 to 52 parts by weight, of the low molecular weight polyethylene having a weight average molecular weight (Mw) of 20,000 to 90,000 g/mol;
(B) 10 to 40 parts by weight, preferably 10 to 30 parts by weight, most preferred 12 to 25 parts by weight, of the first high molecular weight polyethylene having a weight average molecular weight (Mw) of more than 150,000 to 1,000,000 g/mol or the first ultra high molecular weight polyethylene having a weight average molecular weight (Mw) of more than 1,000,000 to 5,000,000 g/mol; and
(C) 10 to 50 parts by weight, preferably 25 to 45 parts by weight, most preferred 30 to 40 parts by weight, of the second high molecular weight polyethylene having a weight average molecular weight (Mw) of more than 150,000 to 1,000,000 g/mol or the second ultra high molecular weight polyethylene having a weight average molecular weight (Mw) of more than 1,000,000 to 5,000,000 g/mol
wherein the multimodal polyethylene composition has a swelling ratio at shear rate 1400 1/sec determined at temperature of 190° C. in a circular length 0.25 mm orifice die 2 mm diameter and entrance angle by 45° of at least 170%, preferably from 180 to 250%, more preferred 185 to 240%, and has a FNCT at 80° C., 3.5 MPa with the environment of 2% solution of Arkopal from 10 to 270 hours, preferably from 12 to 250 hours, more preferred 12 to 240 hours.

In this regard, it is preferred that the multimodal polyethylene composition has the FNCT at 80° C., 3.5 MPa with the environment of 2% solution of Arkopal from 12 to 250 hours, preferably from 12 to 240 hours.

In a preferred embodiment, the multimodal polyethylene composition has a weight average molecular weight from 150,000 to 500,000 g/mol, preferably 200,000 to 400,000 g/mol, measured by Gel Permeation Chromatography.

Furthermore, it is preferred, that the multimodal polyethylene composition has a number average molecular weight from 8,000 to 25,000 g/mol, preferably 10,000 to 20,000 g/mol, measured by Gel Permeation Chromatography.

Preferably, the multimodal polyethylene composition has a Z average molecular weight from 1,000,000 to 5,000,000 g/mol, preferably 1,200,000 to 4,000,000 g/mol, measured by Gel Permeation Chromatography.

Preferably, the multimodal polyethylene composition has a density from 0.940 to 0.966 g/cm3, preferably 0.944 to 0.964 g/cm3, more preferred 0.946 to 0.960 g/cm3 according to ASTM D 1505 and/or MI5 from 0.01 to 7 g/10 min, preferably 0.05 to 5 g/10 min, more preferred 0.1 to 3 g/10 min, and/or $MI_{21}$ from 0.2 to 130 g/10 min, preferably 1.0 to 90 g/10 min, more preferred 2 to 45 g/10 min and most preferred 3 to 45 g/10 min. The object is further achieved by a container comprising the inventive multimodal polyethylene composition.

More preferred, the container is obtainable by blow molding, sheet forming or thermoforming.

Most preferably the container has a volumetric capacity of 0.25 L to 40 L.

In a preferred embodiment the container has a volumetric capacity of 40 L to 500 L.

Finally, the container may preferably have a volumetric capacity of 500 L to 2,000 L.

Regarding the inventive container, it is preferred that the container substantially comprises the inventive multimodal polyethylene composition, which means that the container does comprise further constituents only amounts which do not affect the container properties regarding mechanical strength, swelling ratio and balance between mechanical properties and processing behavior.

A container in terms of the present invention is a basic tool creating a partially or fully enclosed space that can be used to contain, store and transport objects or material.

The smallest size of containers is applied to the house hold bottles with the volume of container in the range of 0.25 to 10 liters. The application is mainly for personal home care bottles such as shampoo, shower cream, body lotion, etc. The larger size of container is the jerrycan, holding the volume at 10-40 liters. The shape of the jerrycan generally is close to a rectangular prism and has a hand hold for convenience. Both bottle and Jerrycan is usually called as a "small blow molding" applications. The larger size of container is used for the fuel tank which has a hollow volume in the range of 40-120 liters. The shape of the fuel tank is designed to match with the available space in the automotive parts. Therefore, the shape of fuel tank is very complex and cannot be defined the dimension specifically. Another container application is the drum which has a capacity volume is the range of 120-500 liters. The shape of drum is a vertical cylindrical. Generally, the fuel tank and drum is categorized as "medium size blow molding". The largest size of the container is the Intermediate Bulk Container (IBC), which holds the volume more than 500 liter. The shape of IBC is generally a cubic for stacking and transportation advantages. It is so called the "large blow molding".

In preferred embodiments of the inventive reactor system, the inventive process, the inventive multimodal polyethylene composition and the inventive container "comprising" is "consisting of".

In preferred embodiments "parts by weight" is "percent by weight".

The above embodiments mentioned to be preferred resulted in even more improved mechanical properties of the obtained multimodal polyethylene composition. Best results were achieved by combining two or more of the above preferred embodiments. Likewise, the embodiments mentioned above to be more or most preferred resulted in the best improvement of mechanical properties.

Surprisingly it was found that by using the inventive reactor system to produce an inventive multimodal polyethylene composition by the inventive process allows to form an inventive container (using the inventive composition) which is superior over the prior art. In particular, it was found that the inventive multimodal polyethylene composition allows to form a container having high mechanical strength, a good swelling ratio and an excellent balance between mechanical properties and processing behavior.

The invention concerns a reactor system for multimodal polyethylene polymerization. The system comprises a first reactor, a second reactor, a third reactor and a hydrogen removal unit placed between the first reactor and the second reactor.

The hydrogen depleted polyethylene from the first reactor affects the polymerization of high molecular weight in the subsequent reactors. In particular, high molecular weight leads to improved mechanical properties of polyethylene that is the advantage for various product application includes injection molding, blow molding and extrusion. The catalyst for producing the multimodal polyethylene resin of this invention is selected from a Ziegler-Natta catalyst, a single site catalyst including metallocene-bases catalyst and non-metallocene-bases catalyst or chromium based might be used, preferably conventional Ziegler-Natta catalyst or single site catalyst. The catalyst is typically used together with cocatalysts which are well known in the art.

Inert hydrocarbon is preferably aliphatic hydrocarbon including hexane, isohexane, heptane, isobutane. Preferably, hexane (most preferred n-hexane) is used. Coordination catalyst, ethylene, hydrogen and optionally α-olefin comonomer are polymerized in the first reactor. The entire product obtained from the first reactor is then transferred to the hydrogen removal unit to remove 98.0 to 99.8% by weight of hydrogen, unreacted gas and some volatiles before being fed to the second reactor to continue the polymerization. The polyethylene obtained from the second reactor is a bimodal polyethylene which is the combination of the product obtained from the first reactor and that of the second reactor. This bimodal polyethylene is then fed to the third reactor to continue the polymerization. The final multimodal (trimodal) polyethylene obtained from the third reactor is the mixture of the polymers from the first, the second and the third reactor.

The polymerization in the first, the second and the third reactor is conducted under different process conditions. These can be the variation in concentration of ethylene and hydrogen in the vapor phase, temperature or amount of comonomer being fed to each reactor.

Appropriate conditions for obtaining a respective homo- or copolymer of desired properties, in particularly of desired molecular weight, are well known in the art. The person skilled in the art is enabled on basis of his general knowledge to choose the respective conditions on this basis.

As a result, the polyethylene obtained in each reactor has a different molecular weight. Preferably, low molecular weight polyethylene or medium molecular weight polyethylene is produced in the first reactor, while high molecular weight polyethylene or ultra high molecular weight polyethylene is produced in the second and third reactor respectively.

The term first reactor refers to the stage where the low molecular weight polyethylene (LMW) or the medium molecular weight polyethylene (MMW) is produced. The term second reactor refers to the stage where the first high or ultra high molecular weight polyethylene (HMW1) is produced. The term third reactor refers to the stage where the second high molecular weight polyethylene or ultra high molecular weight (HMW2) is produced.

The term LMW refers to the low molecular weight polyethylene polymer polymerized in the first reactor having a number average molecular weight (Mn) of 1,000-10,000 g/mol and the weight average molecular weight (Mw) of 20,000-90,000 g/mol.

The term MMW refers to the medium molecular weight polyethylene polymer polymerized in the first reactor having a number average molecular weight (Mn) of 9,000-12,000 g/mol and the weight average molecular weight (Mw) of more than 90,000-150,000 g/mol.

The term HMW1 refers to the high or ultra high molecular weight polyethylene polymer polymerized in the second reactor having a weight average molecular weight (Mw) of more than 150,000 to 5,000,000 g/mol.

The term HMW2 refers to the high or ultra high molecular weight polyethylene polymer polymerized in the third reactor having the weight average molecular weight (Mw) of more than 150,000 to 5,000,000 g/mol.

The LMW or MMW is produced in the first reactor in the absence of comonomer in order to obtain a homopolymer.

To obtain the improved polyethylene properties of this invention, ethylene is polymerized in the first reactor in the absence of comonomer in order to obtain high density LMW polyethylene or MMW polyethylene having density ≥0.965 g/cm$^3$ and MI$_2$ in the range of 10-1000 g/10 min for LMW and 0.1-10 g/10 min for MMW. In order to obtain the target density and MI in the first reactor, the polymerization conditions are controlled and adjusted. The temperature in the first reactor ranges from 70-90° C., preferably 80-85° C. Hydrogen is fed to the first reactor so as to control the molecular weight of the polyethylene. The molar ratio of hydrogen to ethylene in the vapor phase can be varied depending up on the target MI. However, the preferred molar ratio ranges from 0.01-8.0, more preferably 0.01-6.0. The first reactor is operated at pressure between 250 and 900 kPa, preferably 400-850 kPa. An amount of hydrogen present in the vapor phase of the first reactor is in the range of 0.1-95% by mole, preferably 0.1-90% by mol.

Before being fed to the second reactor, the slurry obtained from the first reactor containing LMW or MMW polyethylene preferably in hexane is transferred to a hydrogen removal unit which may have a flash drum connected with depressurization equipment preferably including one or the combination of vacuum pump, compressor, blower and ejector where the pressure in the flash drum is reduced so that volatile, unreacted gas, and hydrogen are removed from the slurry stream. The operating pressure of the hydrogen removal unit typically ranges from 103-145 kPa (abs), preferably 104-130 kPa (abs) in which 98.0 to 99.8% by weight of hydrogen can be removed, preferably 98.0 to 99.5% by weight and most preferred 98.0 to 99.1% by weight.

In this invention, when 98.0 to 99.8% by weight of hydrogen is removed and the polymerization undergoes under these conditions of hydrogen content, very high molecular weight polymer can be achieved this way and Charpy impact strength and Flexural modulus are improved. It was surprisingly found that working outside the range of 98.0 to 99.8% by weight of hydrogen removal, the inventive effect of obtaining very high molecular weight polymer and improving Charpy Impact an Flexural Modulus could not be observed to the same extend. The effect was more pronounced in the ranges mentioned to be preferred.

The polymerization conditions of the second reactor are notably different from that of the first reactor. The temperature in the second reactor ranges from 65-90° C., preferably 68-80° C. The molar ratio of hydrogen to ethylene is not controlled in this reactor since hydrogen is not fed into the second reactor. Hydrogen in the second reactor is the hydrogen left over from the first reactor that remains in slurry stream after being flashed at the hydrogen removal unit. Polymerization pressure in the second reactor ranges from 100-3000 kPa, preferably 150-900 kPa, more preferably 250-400 kPa.

Hydrogen removal is the comparison result of the amount of the hydrogen present in the slurry mixture before and after passing through the hydrogen removal unit. The calculation of hydrogen removal is performed according to the measurement of gas composition in the first and the second reactor by gas chromatography.

After the substantial amount of hydrogen is removed to achieve the inventive concentration, slurry from the hydrogen removal unit is transferred to the second reactor to continue the polymerization. In this reactor, ethylene can be polymerized with or without α-olefin comonomer to form HMW1 polyethylene in the presence of the LMW polyethylene or MMW polyethylene obtained from the first reactor. The α-olefin comomer that is useful for the copolymerization includes $C_{4-12}$, preferably 1-buteane and 1-hexene.

After the polymerization in the second reactor, the slurry obtained is transferred to the third reactor to continue the polymerization.

The HMW2 is produced in the third reactor by polymerizing ethylene with optionally α-olefin comonomer at the presence of LMW or MMW and HMW1 obtained from the first and second reactor. The α-olefin comonomer that is useful for the copolymerization include $C_{4-12}$, preferably 1-butene and 1-hexene.

In order to obtain the target Density and the target MI in the third reactor, the polymerization conditions are controlled and adjusted. However, the polymerization conditions of the third reactor are notably different from the first and second reactor. The temperature in the third reactor ranges from 70-90° C. preferably 70-80° C. Hydrogen is optionally fed to the third reactor so as to control the molecular weight of polyethylene. The molar ratio of hydrogen to ethylene can be varied depending up on the target MI. However, the preferred molar ratio ranges from 0.01-2.0. Polymerization pressure in the third reactor ranges from 150-900 kPa, preferably 150-600 kPa, and is controlled by the addition of inert gas such as nitrogen.

The amount of LMW or MMW present in the multimodal polyethylene composition of the present invention is 30-65 parts by weight. HMW1 present in the polyethylene of the present invention is 5-40 parts by weight and HMW2 present in the polyethylene of the present invention is 10-60 parts by weight. It is possible that HMW1>HMW2 or HMW1<HMW2 depending on the polymerization conditions employed.

The final (free-flow) multimodal polyethylene composition is obtained by separating hexane from the slurry discharged from the third reactor.

The resultant polyethylene powder may then be mixed with antioxidants and optionally additives before being extruded and granulated into pellets.

Definition and Measurement Methods $MI_2$, $MI_5$, $MI_{21}$: Melt flow index (MI) of polyethylene was measured according to ASTM D 1238 and indicated in g/10 min that determines the flowability of polymer under testing condition at 190° C. with load 2.16 kg, 5 kg and 21.6 kg, respectively.

Density: Density of polyethylene was measured by observing the level to which a pellet sinks in a liquid column gradient tube, in comparison with standards of known density. This method is determination of the solid plastic after annealing at 120° C. follow ASTM D 1505.

Molecular weight and Polydispersity index (PDI): The weight average molecular weight (Mw), the number average molecular weight (Mn) and the Z average molecular weight ($M_Z$) in g/mol were analysed by gel permeation chromatography (GPC). Polydispersity index was calculated by Mw/Mn.

Around 8 mg of sample was dissolved in 8 ml of 1,2,4-trichlorobenzene at 160° C. for 90 min. Then the sample solution, 200 µl, was injected into the high temperature GPC with IR5, an infrared detector (Polymer Char, Spain) with flow rate of 0.5 ml/min at 145° C. in column zone and 160° C. in detector zone. The data was processed by GPC One® software, Polymer Char, Spain.

Intrinsic Viscosity (IV)

The test method covers the determination of the dilute solution viscosity of HDPE at 135° C. or Ultra high Molecular Weight Polyethylene (UHMWPE) at 150° C. The polymeric solution was prepared by dissolving polymer in Decalin with 0.2% wt/vol stabilizer (Irganox 1010 or equivalent). The details are given for the determination of IV followed ASTM D2515.

Crystallinity: The crystallinity is frequently used for characterization by Differential Scanning Calorimetry (DSC) follow ASTM D 3418. Samples were identified by peak temperature and enthalpy, as well as the % crystallinity was calculated from the peak area.

Charpy impact strength[a]: Charpy impact strength is determined according to ISO179 at 23° C., and showed in the unit $kJ/m^2$.

Charpy impact strength[b]: Charpy impact strength is measured according to ISO179-1/1 eA on a compression molding specimen according to ISO 1872-2. The cross-sectional area of specimen is 4×10 mm. A V-notch is made on the sample using a 45° angle. After notching, the cross-sectional area remaining is 4×8 mm. In the experiment, the tests are performed at the temperature of 23° C., and −40° C. depend on the application.

Flexural Modulus: The specimen was prepared and performed the test according to ISO178. The flexural tests were done using a universal testing machine equipped with three point bending fixture.

Comonomer content: Quantitative $^{13}$C-NMR was used to determine the comonomer content in polyethylene copolymer. The characteristic signals corresponding to the incorporation of Butene-1 and/or Hexene-1 were identified and calculated to obtain the amount of comonomer in the polymer.

Full Notch Creep Test (FNCT)

FNCT[a] testing was used to evaluate the environmental stress racking resistance of the polymer. The test was done according to ISO16770 for molding material method with the environment of 2% solution of Arkopal. The environment for the test was controlled stably at 80° C. with stress applied at 3.5 MPa until the sample failure.

FNCT[b] is done in the experiment according to ISO16770 method above, however the environment is change to pure water.

Laser Micrometer Extrudate Swell Measurements

The Swell ratio is measured using a single screw extruder, HAAKE PolyLab Rheomex OS at 190° C. Capillary die length 0.25 mm with 2 mm diameter and 45° entrance angle is equipped, and a laser device is used for measuring the extrudate swell at distance 70 mm from die exit. Sample is molten in single screw at 190° C. and extruded at a controlled shear rate 1,400l/s. Maximum Die Swell ratio is calculated by the ratio of die swell and the capillary die diameter.

Elongational Hardening (eh)

Elongational hardening value is used to represent elongational melt strength which implied to better moldability for containers. It is determined by using controlled stress rheometer model DHR3 from TA instrument with SER (Sentmanat extension rheometer) from Xpansion instrument. The sample is prepared to rectangular with dimension 0.5×6×8 mm) by using compression molding and mount with SER geometry and heat to 140° C. under nitrogen atmosphere. Then, the transient elongational is performed at controlled elongational rate of 1 and 5 l/sec. The elongational hardening value (eh) is calculated by the ratio of the maximum elongational hardening viscosity measure at 1 and 5 l/sec and the elongational viscosity measure at 0.1 l/sec at the similar step time. There is no elongational hardening when the ratio is equal to 1. The higher hardening value means higher elongational melt strength.

Tan Delta

Tan delta is the parameter that represents the elasticity of the molten polymer, which strongly influences on the swelling ratio of the polymer. The Tan delta is determined by using controlled stress rheometer model DHR3 from TA instrument. The geometry is Plate-Plate 25 mm diameter at the measurement gap 1 mm. The dynamic oscillatory shear performed under nitrogen atmosphere at 190° C. Tan (delta) 600 is calculated ratio of Loss modulus (G") and storage modulus (G') at angular frequency 600 rad/s.

EXPERIMENTAL AND EXAMPLES

Composition Related Examples

The medium or high density polyethylene preparation was carried out in three reactors in series. Ethylene, hydrogen, hexane, catalyst and TEA (triethyl aluminum) co-catalyst were fed into a first reactor in the amount shown in table 1. A commercial available Ziegler-Natta catalyst was used. The catalyst preparation is for example described in Hungary patent application 08 00771r. The polymerization in first reactor was carried out to make a low molecular weight polyethylene or medium molecular weight polyethylene. All of polymerized slurry polymer from first reactor was then transferred to a hydrogen removal unit to remove unreacted gas and some of hexane from polymer. The operating pressure in the hydrogen removal unit was be varied in a range of 100 to 115 kPa (abs) where residual hydrogen was removed more than 98% by weight but not more than 99.8% by weight from hexane before transferring to a second polymerization reactor. Some fresh hexane, ethylene and/or comonomer were fed into second reactor to produce first high molecular weight polyethylene (HMW1). All of polymerized polymer from second reactor was fed into the third reactor which produce second high molecular weight polyethylene (HMW2). Ethylene, comonomer, hexane and/or hydrogen were fed into the third reactor.

Comparative Example 1 (CE1)

A homopolymer was produced in first reactor to obtain a low molecular weight portion before transferring such polymer to hydrogen removal unit. Reactant mixture was introduced into the hydrogen removal unit to separate the unreacted mixture from the polymer. Residual hydrogen was removed 97.6% by weight when hydrogen removal unit was operated at pressure of 150 kPa (abs). The low molecular weight polymer was then transferred to the second reactor to produce a first high molecular weight polymer. Final, produced polymer from second reactor was transferred to the third reactor to create a second high molecular weight polymer. In third, a copolymerization was carried out by feeding 1-butene as a comonomer.

Example 1 (E1)

Example 1 was carried out in the same manner as Comparative Example 1 except that the hydrogen removal unit was operated at pressure of 115 kPa (abs). The residual of hydrogen from first reactor was removed 98.0% by weight. Characteristic properties of these multimodal polymers are shown in Table 2. As it can be seen, an improvement of stiffness-impact balance was observed when the percentage of removed hydrogen residual increased compared with the properties of Comparative Example 1.

Example 2 (E2)

Example 2 was carried out in the same manner as Comparative Example 1 except that the hydrogen removal unit was operated at pressure of 105 kPa (abs). The residual hydrogen from the first reactor was removed to an extend of 99.1% by weight. The operational of hydrogen removal unit under this pressure leads to an expansion of a polymer properties range. As seen in Table 2, a final melt flow rate of E2 was lower than a final melt flow rate of CE1 resulted in an improvement of Charpy impact strength while still maintained the flexural modulus.

Comparative Example 2 (CE2)

Comparative Example 2 was carried out in the same manner as Comparative Example 1 except that the hydrogen removal unit was operated at pressure of 102 kPa (abs). The residual of hydrogen from first reactor was removed to an extend of 99.9% by weight. The operational of hydrogen removal unit under this pressure leads to an expansion of a polymer properties range. As seen in Table 2, the final melt flow rate and a density of CE2 were quite similar to a final melt flow rate and a density of E2. A decay of Charpy impact strength was showed in CE2 compared to E2.

Comparative Example 3 (CE3)

A homopolymer was produced in a first reactor to obtain a low molecular weight portion before transferring the polymer to a hydrogen removal unit. Reactant mixture was introduced into the hydrogen removal unit to separate the unreacted mixture from the polymer. Hydrogen residual was removed to an extend of 97.9% by weight when hydrogen removal unit was operated at pressure of 150 kPa (abs). The low molecular weight polymer was then transferred to a second reactor to produce an ultra high molecular weight polymer. In the second reactor, a copolymerization was carried out by feeding 1-butene as a comonomer. Finally, in-situ bimodal copolymer from second reactor was transferred to a third reactor to create a high molecular weight copolymer portion. Characteristic properties of this multimodal polymers is shown in Table 2. A significant improvement in Charpy impact strength at room temperature could be obtained by decreasing a density of final polymer when co-polymer was produced in both the second and the third reactor.

Example 3 (E3)

Example 3 was carried out in the same manner as Comparative Example 3 except that the hydrogen removal unit was operated at pressure of 105 kPa (abs). The residual of hydrogen from first reactor was removed to an extend of 98.8% by weight. The polymer obtained by this process operation had a melt flow rate of 0.195 g/10 min (5 kg loading) lower than such value obtained from CE3. As seen in Table 2, it revealed an improvement of stiffness-impact balance when the percentage of removed hydrogen residual increases compared with the properties of Comparative Example 3.

Example 4 (E4)

A homopolymer was produced in the first reactor to obtain a medium molecular weight portion before transferring such polymer to hydrogen removal unit. The hydrogen removal unit was operated at pressure of 105 kPa (abs) to separate the unreacted mixture from the polymer. The residual of hydrogen from first reactor was removed to an extend of 98.9% by weight. The medium molecular weight polymer was then transferred to the second reactor to produce a first ultra high molecular weight polymer. Finally, produced polymer from second reactor was transferred to the third reactor to create a second ultra high molecular weight polymer. The second and third reactors are operated under hydrogen depleted polyethylene polymerization. The processable in-situ ultra high molecular weight polyethylene is produced by this process operation leads to an excellent improvement of Charpy impact strength while still maintained the flexural modulus. The conventional UHMWPE with very high IV was known that it was unable to measured MI21. The inventive example E4 with IV of 9 dl/g show good melt flow ability beyond the known art.

Comparative Example 4 (CE4)

A homopolymer was produced in first reactor to obtain a low molecular weight portion before transferring such polymer to hydrogen removal unit. Reactant mixture was introduced into the hydrogen removal unit to separate the unreacted mixture from the polymer. Residual hydrogen was removed 97.6% by weight when hydrogen removal unit was operated at pressure of 150 kPa (abs). The low molecular weight polymer was then transferred to the second reactor to produce a first high molecular weight polymer. Final, produced polymer from second reactor was transferred to the third reactor to create a second high molecular weight polymer. In third, a copolymerization was carried out by feeding 1-butene as a comonomer. As seen in Table 2 and 3, the final melt flow rate of CE4 were quite similar to a final melt flow rate of E5. A decay of charpy impact and flexural modulus were showed in CE4 compared to E5, even it showed lower density of E5.

Example 5 (E5)

Example 5 was carried out in the same manner as Comparative Example 4 except that the hydrogen removal unit was operated at pressure of 115 kPa (abs). The residual of hydrogen from first reactor was removed to an extend of 98.5% by weight. The polymer obtained by this process operation had a melt flow rate of 48 g/10 min (5 kg loading) lower than such value obtained from CE3. As seen in Table 2, it revealed an improvement of stiffness-impact balance when the percentage of removed hydrogen residual increases compared with the properties of Comparative Example 4.

Example 6 (E6)

Example 6 was carried out in the same manner as Example 4 except that the comonomer feeding in the third ultra high molecular weight polyethylene. The polymer produced by this process leads to an excellent improvement of Charpy impact strength while still maintained the flexural modulus. As shown in table 2, the inventive example 6 with IV of 23 dl/g show the high impact strength (one notched impact without break) and flexural modulus as compared to comparative samples, however, the melt flow index is unmeasurable due to high viscosity and high Mw.

TABLE 1

|  | CE1 | E1 | E2 | CE2 | CE3 | E3 | E4 | CE4 | E5 | E6 |
|---|---|---|---|---|---|---|---|---|---|---|
| $W_A$, % | 55 | 55 | 55 | 55 | 45 | 45 | 30 | 50 | 50 | 30 |
| $W_B$, % | 20 | 20 | 20 | 20 | 25 | 25 | 30 | 10 | 10 | 30 |
| $W_C$, % | 25 | 25 | 25 | 25 | 30 | 30 | 40 | 40 | 40 | 40 |

TABLE 1-continued

|  | CE1 | E1 | E2 | CE2 | CE3 | E3 | E4 | CE4 | E5 | E6 |
|---|---|---|---|---|---|---|---|---|---|---|
| First reactor | | | | | | | | | | |
| Polymerization type | Homo | Homo | Homo | Homo | Homo | Homo | Homo | Homo | Homo | Homo |
| Temperature, °C. | 80 | 80 | 80 | 80 | 80 | 80 | 80 | 80 | 80 | 80 |
| Total pressure, kPa | 800 | 800 | 800 | 800 | 800 | 800 | 800 | 800 | 800 | 800 |
| Ethylene, g | 1,100.72 | 1,100.70 | 1,100.86 | 1,100.74 | 900.30 | 900.30 | 540.50 | 725.21 | 725.57 | 485.70 |
| Hydrogen, g | 1.62 | 1.62 | 1.55 | 1.55 | 2.97 | 2.99 | 1.34 | 1.13 | 1.13 | 1.23 |
| Hydrogen removal unit | | | | | | | | | | |
| Pressure, kPa (abs) | 150 | 115 | 105 | 102 | 150 | 105 | 105 | 150 | 115 | 105 |
| Hydrogen remove, % | 97.6 | 98.0 | 99.1 | 99.9 | 97.9 | 98.8 | 98.9 | 97.7 | 98.5 | 98.3 |
| Second reactor | | | | | | | | | | |
| Polymerization type | Homo | Homo | Homo | Homo | Copo | Copo | Homo | Copo | Copo | Homo |
| Temperature, °C. | 70 | 70 | 70 | 70 | 70 | 70 | 70 | 80 | 80 | 70 |
| Total pressure, kPa | 250 | 250 | 250 | 250 | 250 | 250 | 400 | 300 | 300 | 400 |
| Ethylene, g | 400.52 | 400.81 | 400.35 | 400.06 | 500.17 | 500.31 | 540.36 | 145.35 | 145.21 | 485.78 |
| Hydrogen, g | 0 | 0 | 0 | 0 | 0 | 0 | 0 | 0 | 0 | 0 |
| 1-butene, g | 0 | 0 | 0 | 0 | 18.84 | 18.91 | 0 | 8 | 8 | 0 |
| Third reactor | | | | | | | | | | |
| Polymerization type | Copo | Copo | Copo | Copo | Copo | Copo | Homo | Copo | Copo | Copo |
| Temperature, °C. | 70 | 70 | 70 | 70 | 70 | 70 | 80 | 80 | 80 | 70 |
| Total pressure, kPa | 400 | 400 | 400 | 400 | 400 | 400 | 600 | 600 | 600 | 600 |
| Ethylene, g | 500.74 | 500.11 | 500.30 | 500.63 | 600.02 | 601.19 | 720.60 | 580.53 | 580.46 | 647.54 |
| Hydrogen, g | 0 | 0.001 | 0.001 | 0.001 | 0 | 0.001 | 0 | 0.59 | 1.37 | 0 |
| 1-butene, g | 35.05 | 30.01 | 30.03 | 30.04 | 60.01 | 60.04 | 0 | 27 | 27 | 20.60 |

$W_A$ means percent by weight of Polymer in the first reactor
$W_B$ means percent by weight of Polymer in the second reactor
$W_C$ means percent by weight of Polymer in the third reactor

TABLE 2

|  | CE1 | E1 | E2 | CE2 | CE3 |
|---|---|---|---|---|---|
| Powder | | | | | |
| $MI_5$, g/10 min | 0.474 | 0.372 | 0.240 | 0.242 | 0.275 |
| $MI_{21}$, g/10 min | 13.83 | 10.80 | 7.38 | 7.23 | 6.40 |
| Density, g/cm³ | 0.9565 | 0.9578 | 0.9555 | 0.9567 | 0.9441 |
| IV, dl/g | — | — | — | — | — |
| Mw | 276,413 | 244,279 | 291,295 | 319,487 | 252,160 |
| Mn | 8,877 | 8,724 | 8,843 | 8,472 | 8,016 |
| Mz | 2,788,607 | 2,370,678 | 3,401,041 | 4,135,007 | 1,638,224 |
| PDI | 31 | 28 | 33 | 38 | 31 |
| Pellet | | | | | |
| $MI_5$, g/10 min | 0.436 | 0.410 | 0.232 | 0.199 | 0.298 |
| $MI_{21}$, g/10 min | 14.46 | 11.68 | 7.876 | 6.696 | 7.485 |
| Density, g/cm³ | 0.9577 | 0.9574 | 0.9568 | 0.9566 | 0.9442 |
| IV, dl/g | 2.97 | 3.03 | 3.52 | 3.64 | 3.12 |
| % Crystallinity, % | 64.70 | 67.24 | 64.78 | 66.16 | 57.49 |
| Charpy[a], 23° C., kJ/m² | 23.5 | 29.9 | 35.3 | 30.5 | 47.9 |
| Flexural modulus, MPa | 1,130 | 1,210. | 1,123 | 1,123 | 727 |

|  | E3 | E4 | CE4 | E5 | E6 |
|---|---|---|---|---|---|
| Powder | | | | | |
| $MI_5$, g/10 min | 0.200 | — | 54.80 | 48.07 | NA |
| $MI_{21}$, g/10 min | 4.81 | 0.145 | 641 | 653 | NA |
| Density, g/cm³ | 0.9438 | 0.9534 | 0.9606 | 0.9590 | 0.9409 |

TABLE 2-continued

| | | | | | |
|---|---|---|---|---|---|
| IV, dl/g | — | 9.00 | 1.07 | 1.06 | 23 |
| Mw | 306,468 | 868,813 | 77,334 | 91,752 | 1,269,336 |
| Mn | 7,637 | 24,107 | 5,400 | 6,035 | 23,450 |
| Mz | 2,643,953 | 5,112,060 | 667,276 | 1,027,956 | 5,262,195 |
| PDI | 40 | 36 | 14 | 15 | 54.13 |
| | | | Pellet | | |
| $MI_5$, g/10 min | 0.195 | — | 60.62 | 55.47 | — |
| $MI_{21}$, g/10 min | 4.604 | — | 713.1 | 752.2 | — |
| Density, g/cm$^3$ | 0.9440 | — | 0.9608 | 0.9594 | — |
| IV, dl/g | 3.37 | 9.00 | 1.0 | 1.1 | 23 |
| % Crystallinity, % | 54.05 | 68.23 | 69.52 | 65.64 | 58.20 |
| Charpy$^a$, 23° C., kJ/m$^2$ | 50.9 | 84.4 | 1.5 | 1.8 | 85.41 |
| Flexural modulus, MPa | 785 | 1,109 | 1,147 | 1,196 | 890 |

Composition Related Examples

To prepare an inventive container from the above inventive composition, it was surprisingly found that the sub-range of the multimodal polyethylene composition which might be obtained using the inventive reactor system is particularly preferred. In detail, it was found that the composition is suitable to form the inventive container are as follows and have the following properties. The following examples and comparative examples refer to the container related composition.

Polyethylene compositions for small, medium and large containers are included in the examples.

Small Container Applications

Polyethylene composition for Jerrycan and bottle applications are included in the examples for small containers. The process conditions and polymer properties are shown in table 3. The inventive examples E7, E8 and E9 were compared with comparative examples CE5, CE6 and CE7 for Jerrycans. The inventive example E10 and E11 was compared with comparative examples CE8 for bottles. The physical and mechanical properties are shown in Table 4.

The inventive example E7, E8, E9, E10 and E11 were produced with the inventive process for making multimodal polyethylene composition. The 1-Butene is applied for copolymerization of inventive example E7, E8, E10 and E11 while 1-hexene is used in the inventive example E9.

The comparative example CE5 was commercial resin Marlex® HXM50100 using chromium catalyst in Chevron Phillips Loop Slurry PE Process.

The comparative example CE6 is the multimodal polyethylene composition produced by the inventive process and having the composition out of the specific range of composition for containers.

The comparative example CE7 and CE8 were multimodal polyethylene composition selected from US 2006/0074194 A1 and WO2004/056921 A1, respectively.

TABLE 3

Process condition and polymer properties of inventive example E7, E8, E9, E10 and E11 and comparative example, CE5, CE6, CE7 and CE8.

| | Comparative example 5 (CE5) | Inventive Example 7 (E7) | Inventive examples (E8) | Inventive Example 9 (E9) | Comparative example 6 (CE6) |
|---|---|---|---|---|---|
| | | | Polymerization condition 1$^{st}$ Reactors | | |
| Split ratio (%) | N/A | 47-48 | 50-52 | 50-52 | 50-52 |
| Temperature (° C.) | N/A | 81-85 | 81-85 | 81-85 | 81-85 |
| Pressure (kPa) | N/A | 500-600 | 600-700 | 600-700 | 700-800 |
| Hydrogen (L/hr) | N/A | 98 | 139 | 85 | 164 |
| | | | 2nd Reactors | | |
| Split ratio (%) | N/A | 20-21 | 17-18 | 12-14 | 6-8 |
| Temperature (° C.) | N/A | 70-75 | 70-75 | 70-75 | 70-75 |
| Pressure (kPa) | N/A | 150-300 | 150-300 | 150-300 | 150-300 |
| Comonomer/ C2H4 | N/A | 0.001 | 0.003 | 0.001 | 0.004 |
| H2 removal (%) | N/A | 98.96 | 98.97 | 98.97 | 98.91 |

TABLE 3-continued

Process condition and polymer properties of inventive example E7, E8, E9, E10 and E11 and comparative example, CE5, CE6, CE7 and CE8.

| | | | | | |
|---|---|---|---|---|---|
| | | | 3rd Reactors | | |
| Split ratio (%) | N/A | 31-32 | 29-31 | 37-38 | 40-42 |
| Temperature (° C.) | N/A | 70-75 | 70-75 | 70-75 | 70-75 |
| Pressure (kPa) | N/A | 150-300 | 150-300 | 150-300 | 150-300 |
| Hydrogen (L/hr) | N/A | 34 | 11 | 6 | 1 |
| Comonomer/ C2H4 feed | N/A | 0.013 | 0.010 | 0.130 | 0.009 |
| | | | Polymer Properties | | |
| Mw | 213,927 | 287,680 | 289,586 | 344,356 | N/A |
| Mn | 18,152 | 14,134 | 13,654 | 11,505 | N/A |
| Mw/Mn | 11.79 | 20.41 | 21.21 | 29.93 | N/A |
| Mz | 1,879,128 | 1,881,789 | 1,870,039 | 2,829,938 | N/A |
| Comonomer type | 1-Hexene | 1-Butene | 1-Butene | 1-Hexene | 1-Butene |
| Comonomer content (% mole) | 0.28 | 0.45 | 0.42 | 0.47 | N/A |

| | Comparative example 7 (CE7) | Comparative example 8 (CE8) | Inventive Example 10 (E10) | Inventive Example 11 (E11) |
|---|---|---|---|---|
| | | Polymerization condition 1$^{st}$ Reactors | | |
| Split ratio (%) | 45 | 46 | 44-46 | 47-49 |
| Temperature (° C.) | N/A | N/A | 81-85 | 81-85 |
| Pressure (kPa) | N/A | N/A | 500-600 | 450-500 |
| Hydrogen (L/hr) | N/A | N/A | 135 | 82 |
| | | 2nd Reactors | | |
| Split ratio (%) | 29 | 32 | 17-18 | 12-14 |
| Temperature (° C.) | N/A | N/A | 70-75 | 65-70 |
| Pressure (kPa) | N/A | N/A | 150-300 | 140-250 |
| Comonomer/ C2H4 | N/A | N/A | 0.003 | 0.001 |
| H2 removal (%) | N/A | N/A | 98.97 | 98.62 |
| | | 3rd Reactors | | |
| Split ratio (%) | 26 | 22 | 37-39 | 37-41 |
| Temperature (° C.) | N/A | N/A | 70-75 | 75-80 |
| Pressure (kPa) | N/A | N/A | 150-300 | 150-300 |
| Hydrogen (L/hr) | N/A | N/A | 37 | 54 |
| Comonomer/ C2H4 feed | N/A | N/A | 0.002 | 0.016 |
| | | Polymer Properties | | |
| Mw | N/A | N/A | 231,117 | 217,462 |
| Mn | N/A | N/A | 11,044 | 10,492 |
| Mw/Mn | N/A | N/A | 20.93 | 20.73 |
| Mz | N/A | N/A | 1,872,020 | 1,877,827 |
| Comonomer type | 1-Butene | 1-Butene | 1-Butene | 1-Butene |
| Comonomer content (% mole) | N/A | N/A | 0.47 | 0.39 |

TABLE 4

Polymer Properties of Inventive example, E7, E8, E9, E10 and E11 comparative example, CE5, CE6, CE7 and CE8.

| | CE5 | E7 | E8 | E9 | CE6 | CE7 | CE8 | E10 | E11 |
|---|---|---|---|---|---|---|---|---|---|
| Physical properties | | | | | | | | | |
| $MI_5$ (g/10 min) | 0.263 | 0.307 | 0.286 | 0.222 | 0.236 | 0.400 | 0.950 | 1.15 | 1.61 |
| $MI_{21}$ (g/10 min) | 7.44 | 7.02 | 7.47 | 7.45 | 7.51 | N/A | N/A | 22.18 | 31.15 |
| Density (g/cm³) | 0.9520 | 0.9536 | 0.9553 | 0.9552 | 0.9546 | 0.9540 | 0.9570 | 0.9557 | 0.9579 |
| Mechanical properties | | | | | | | | | |
| Charpy[b] Impact 23° C. (kJ/m²) | 23.4 | 23.6 | 23.8 | 30.9 | 22.83 | 16 | 12.3 | 11.8 | 8.33 |
| Flexural modulus (MPa) | 931 | 1,006 | 1,037 | 1,010 | 949 | N/A | N/A | 1,124 | 1,143 |
| FNCT[a] (80° C., 3.5 MPa, hr) | 10 | 42 | 57 | 39 | N/A | N/A | 10 | 18 | 15 |
| Processing properties | | | | | | | | | |
| Swell ratio at $\gamma = 1400\ s^{-1}$ | 295% | 214% | 206% | 209% | 125% | 135% | 142% | 233% | 237% |
| Elongational hardening (eh) at rate 1 1/sec | 1.17 | 1 | 1 | 1.10 | 1 | N/A | N/A | 1 | 1 |
| Elongational hardening (eh) at rate 5 1/sec | 1.09 | 1 | 1 | 1.08 | 1 | N/A | N/A | 1 | 1 |
| Tan(delta) at 600 rad/s | 0.512 | 0.435 | 0.433 | 0.452 | 0.364 | N/A | N/A | 0.550 | 0.575 |

The polyethylene produced with Chromium catalyst was generally known for high melt strength and swell ratio contributed by the long chain branch while the mechanical properties are acceptable for container applications. The mechanical properties of inventions (E7, E8 and E9) including flexural modulus, charpy impact strength as well as FNCT[a] are more superior over the prior art, CE5. Additionally, when 1-hexene was used as comonomer in the $2^{nd}$ and $3^{rd}$ reactor component, the inventive example E9 shows good melt strength as determined by the elongation hardening rate. The good balance of processing and mechanical properties was contributed from the ultrahigh molecular weight portions in the inventive multimodal polyethylene compositions. The high elasticity of multimodal polyethylene composition was also detected in the inventive samples as determined by tan delta, which ensure the good processing behavior of the multimodal polyethylene composition.

The significant difference was found when the ultrahigh molecular weight composition in the $2^{nd}$ reactor is higher than 10 wt %. This was obviously seen when comparing the results of inventive examples (E7, E8 and E9) with comparative example (CE6) produced using the inventive process. The mechanical balance of flexural modulus, Charpy impact of CE6 is accordance well with the advantage of the inventive process however the swell ratio is dramatically lower than the invention when the composition is out of the claim range. Similarly, the multimodal polyethylene composition contributes the excellent swell ratio and charpy impact resistance than the prior art CE7.

Similar experimental results were obtained from the highest $MI_5$ range sample which applicable for the bottle size applications. The E10 and E11 show higher FNCT[a] than CE8. Additionally, the swell ratio results shown that E10 and E11 have a more superior processing property of blow molding application than CE8.

These evidence supports that the specific range of multimodal polyethylene composition plays an important role and provides a good balance of mechanical strength with the good processing properties in parallel for small blow molding containers.

Medium and Large Container Applications

Polyethylene composition for fuel tank and intermediate bulk container (IBC) applications are included in the examples for medium and large containers. The process conditions and polymer properties are shown in table 5. The inventive examples E12, E13 and E14 were compared with comparative examples CE9, CE10 and CE11. The physical and mechanical properties are shown in Table 6.

The inventive example E12, E13 and E14 were produced with the inventive process for making multimodal polyethylene composition. The 1-butene comonomer is applied for copolymerization of inventive example E12 and E13 while 1-hexene is used in the inventive example E14.

The comparative example CE9 and CE10 were commercial resin using chromium catalyst in Chevron Phillips Loop Slurry PE Process. The CE9 and CE10 are Novatec® HB111R and Titanex® HM4560UA, respectively.

The comparative example CE11 was multimodal polyethylene composition selected from U.S. Pat. No. 8,802,768 B2.

TABLE 5

Process condition of Inventive example, E12, E13, E14 and comparative example, CE9, CE10, and CE11.

|  | Comparative example 9 (CE9) | Comparative example 10 (CE10) | Inventive Example 12 (E12) | Inventive Example 13 (E13) | Inventive Example 14 (E14) | Comparative example 11 (CE11) |
|---|---|---|---|---|---|---|
| *Polymerization condition* | | | | | | |
| 1st Reactors | | | | | | |
| Split ratio (%) | N/A | N/A | 47-49 | 48-50 | 50-52 | 50 |
| Temperature (°C.) | N/A | N/A | 81-85 | 81-85 | 81-85 | N/A |
| Pressure (kPa) | N/A | N/A | 500-550 | 550-600 | 600-700 | N/A |
| Hydrogen (L/hr) | N/A | N/A | 150 | 158 | 85 | N/A |
| 2nd Reactors | | | | | | |
| Split ratio (%) | N/A | N/A | 19-21 | 19-21 | 12-14 | 27 |
| Temperature (°C.) | N/A | N/A | 70-75 | 70-75 | 70-75 | N/A |
| Pressure (kPa) | N/A | N/A | 150-300 | 150-300 | 150-300 | N/A |
| Comonomer/C2H4 | N/A | N/A | 0.002 | 0.002 | 0.001 | N/A |
| H2 removal (%) | N/A | N/A | 99.02 | 99.08 | 98.97 | N/A |
| 3rd Reactors | | | | | | |
| Split ratio (%) | N/A | N/A | 30-32 | 30-32 | 37-38 | 23 |
| Temperatur (°C.) | N/A | N/A | 70-75 | 70-75 | 70-75 | N/A |
| Pressure (kPa) | N/A | N/A | 150-300 | 150-300 | 150-300 | N/A |
| Hydrogen (L/hr) | N/A | N/A | 8 | 11 | 6 | N/A |
| Comonomer/$C_2H_4$ feed | N/A | N/A | 0.06 | 0.05 | 0.13 | N/A |
| *Polymer structure* | | | | | | |
| Mw | 278,486 | 251,179 | 279,068 | 254,592 | 344,356 | N/A |
| Mn | 16,086 | 12,552 | 13,429 | 11,770 | 11,505 | N/A |
| Mw/Mn | 17.31 | 20.02 | 20.78 | 21.63 | 29.93 | N/A |
| Mz | 2,957,950 | 2,506,738 | 1,536,565 | 1,509,257 | 2,829,938 | N/A |
| Co-monomer type | 1-Hexene | 1-Hexene | 1-Butene | 1-Butene | 1-Hexene | 1-Butene |
| Comonomer content (% mole) | 0.47 | 0.39 | 0.74 | 0.63 | 0.47 | N/A |

TABLE 6

Polymer properties of Inventive example E12, E13, E14 and comparative example CE9, CE10, and CE11.

|  | Comparative example 9 (CE9) | Comparative example 10 (CE10) | Inventive Example 12 (E12) | Inventive Example 13 (E13) | Inventive Example 14 (E14) | Comparative example 11 (CE11) |
|---|---|---|---|---|---|---|
| *Physical properties* | | | | | | |
| $MI_5$ (g/10 min) | 0.194 | 0.302 | 0.256 | 0.258 | 0.222 | N/A |
| $MI_{21}$ (g/10 min) | 6.03 | 7.11 | 6.02 | 5.58 | 7.45 | 4.40 |
| Density (g/cm³) | 0.9477 | 0.9499 | 0.9484 | 0.9516 | 0.9552 | 0.948 |
| *Mechanical properties* | | | | | | |
| Charpy impact[b] resistance 23° C. (kJ/m²) | 28.9 | 22.1 | 30.6 | 24.9 | 30.9 | N/A |
| Charpy impact[b] resistance −40° C. (kJ/m²) | 12.3 | 8.8 | 12.4 | 12.9 | 18.9 | N/A |
| Flexural modulus (MPa) | 835 | 847 | 866 | 914 | 1,010 | N/A |
| FNCT[a] (80° C., 3.5 MPa, hr) | N/A | 28 | 227 | 140 | 189 | N/A |
| FNCT[b], water (hr) | 70 | N/A | >700 | N/A | N/A | N/A |
| *Processing properties* | | | | | | |
| Swell ratio at γ = 1400 s⁻¹ | 285% | 290% | 193% | 189% | 209% | 163% |
| Elongational hardening value (eh) at rate 1 1/sec | 1.16 | 1.01 | 1 | 1 | 1.10 | N/A |

TABLE 6-continued

Polymer properties of Inventive example E12, E13, E14 and comparative example CE9, CE10, and CE11.

| | Comparative example 9 (CE9) | Comparative example 10 (CE10) | Inventive Example 12 (E12) | Inventive Example 13 (E13) | Inventive Example 14 (E14) | Comparative example 11 (CE11) |
|---|---|---|---|---|---|---|
| Elongational hardening value (eh) at rate 5 1/sec | 1.11 | 1.05 | 1 | 1 | 1.08 | N/A |
| Tan(delta) at 600 rad/s | 0.532 | 0.485 | 0.407 | 0.411 | 0.407 | N/A |

The inventions for medium and large container show the similar tendency of the results to those of small containers. Focusing on FNCT, both method $FNCT^a$ and $FNCT^b$ on the example CE9, CE10 compared with E12, E13 and E14; the testing results emphasized that all the samples produced with the inventive process for making multimodal polyethylene composition have the $FNCT^{a,b}$ properties remarkably beyond the prior arts (CE9, CE10) with 1-butene or 1-hexene is applied as the comonomer in copolymerization of the $2^{nd}$ and $3^{rd}$ reactor components as shown in the table 6.

For the swell ratio testing results, the inventive multimodal polyethylene composition examples has the swell ratio higher than that of as comparative example CE11 significantly, however the mechanical properties in the patent application U.S. Pat. No. 8,802,768 B2 cannot be compared with the inventive testing results because of different testing methods.

The good balance of processing and mechanical properties was contributed from the ultrahigh molecular weight portions in the inventive multimodal polyethylene compositions.

The evidence supports that the specific range of multimodal polyethylene composition plays an important role to the swell ratio and provides a good balance of mechanical strength with processing properties for medium and large blow molding containers.

The features disclosed in the foregoing description and in the claims may, both separately and in any combination, be material for realizing the invention in diverse forms thereof.

The invention claimed is:

1. A process for producing a multimodal polyethylene composition in a reactor system comprising:
   (a1) a first reactor having a catalyst system selected from Ziegler-Natta catalyst or metallocene;
   (b1) a hydrogen removal unit arranged between the first reactor and a second reactor, said hydrogen removal unit comprising at least one vessel connected with depressurization equipment selected from a vacuum pump, a compressor, a blower, an ejector or a combination thereof, the depressurization equipment configured to adjust an operating pressure to a pressure in a range of 103-145 kPa (abs);
   (c1) the second reactor; and
   (d1) a third reactor,
   the process comprising:
   (a2) polymerizing ethylene in an inert hydrocarbon medium in the first reactor in the presence of the catalyst system and hydrogen in an amount of 0.1-95% by mole with respect to the total gas present in the vapor phase in the first reactor to obtain a low molecular weight polyethylene having a weight average molecular weight (Mw) of 20,000 to 90,000 g/mol or medium molecular weight polyethylene having a weight average molecular weight (Mw) of more than 90,000 to 150,000 g/mol wherein the low molecular weight polyethylene, respectively the medium molecular weight polyethylene, has a density at least 0.965 g/cm3, and the low molecular weight polyethylene has MI2 in the range from 10 to 1,000 g/10 min and the medium molecular weight polyethylene has MI2 in the range from 0.1 to 10 g/10 min;
   (b2) removing in the hydrogen removal unit 98.0 to 99.8% by weight of the hydrogen comprised in a slurry mixture obtained from the first reactor at a pressure in the range of 103-145 kPa (abs) and transferring the obtained residual mixture to the second reactor;
   (c2) polymerizing ethylene and optionally $C_{4-12}$ α-olefin comonomer in the second reactor in the presence of a catalyst system, selected from Ziegler-Natta catalyst or metallocene, and in the presence of hydrogen in an amount obtained in step (b2) to obtain a first high molecular weight polyethylene having a weight average molecular weight (Mw) of more than 150,000 to 1,000,000 g/mol or a first ultra high molecular weight polyethylene in the form of a homopolymer or a copolymer having a weight average molecular weight (Mw) of more than 1,000,000 to 5,000,000 g/mol and transferring a resultant mixture to the third reactor; and
   (d2) polymerizing ethylene, and optionally $C_{4-12}$ α-olefin comonomer in the third reactor in the presence of a catalyst system, selected from Ziegler-Natta catalyst or metallocene, and hydrogen, wherein the amount of hydrogen in the third reactor is in a range of 0.1-70% by mol, with respect to the total gas present in the vapor phase in the third reactor or optionally substantial absence of hydrogen to obtain a second high molecular weight polyethylene having a weight average molecular weight (Mw) of more than 150,000 to 1,000,000 g/mol or a second ultra high molecular weight polyethylene homopolymer or copolymer having a weight average molecular weight (Mw) of more than 1,000,000 to 5,000,000 g/mol.

2. The process according to claim 1, wherein the pressure in the hydrogen removal unit is in the range of 105 to 115 kPa (abs).

3. The process according to claim 1, wherein the hydrogen removal unit further comprises a stripping column for the separation of the hydrogen in the slurry mixture from a liquid diluent.

4. The process of claim 1, wherein the amount of hydrogen in the third reactor is in a range of 0.1-60% by mol.

5. The process according to claim 1, wherein the removing is removing of 98.0-99.5% by weight of the hydrogen.

6. The process according to claim 5, wherein the pressure in the hydrogen removal unit is in the range of 105 to 115 kPa (abs).

7. A multimodal polyethylene composition comprising:
(A) 30 to 65 parts by weight of a low molecular weight polyethylene having a weight average molecular weight (Mw) of 20,000 to 90,000 g/mol;
(B) 10 to 40 parts by weight of a first high molecular weight polyethylene having a weight average molecular weight (Mw) of more than 150,000 to 1,000,000 g/mol or a first ultra high molecular weight polyethylene having a weight average molecular weight (Mw) of more than 1,000,000 to 5,000,000 g/mol; and
(C) 10 to 50 parts by weight of a second high molecular weight polyethylene having a weight average molecular weight (Mw) of more than 150,000 to 1,000,000 g/mol or a second ultra high molecular weight polyethylene having a weight average molecular weight (Mw) of more than 1,000,000 to 5,000,000 g/mol,
wherein the multimodal polyethylene composition has a FNCT at 80° C., 3.5 MPa with the environment of 2% solution of 4-nonylphenyl-polyethylene glycol from 10 to 270 hours, and
wherein (A), (B), and (C) each have a different weight average molecular weight.

8. The multimodal polyethylene composition according to claim 7, wherein the multimodal polyethylene composition has a swelling ratio at shear rate 1400 1/sec determined at temperature of 190° C. in a circular length 0.25 mm orifice die 2 mm diameter and entrance angle by 45° of at least 170%.

9. The multimodal polyethylene composition according to claim 7, wherein the FNCT at 80° C., 3.5 MPa with the environment of 2% solution of 4-nonylphenyl-polyethylene glycol is from 12 to 250 hours.

10. The multimodal polyethylene composition according to claim 7, wherein the multimodal polyethylene composition has a weight average molecular weight from 150,000 to 500,000 g/mol, measured by Gel Permeation Chromatography.

11. The multimodal polyethylene composition according to claim 10, wherein the weight average molecular weight is from 200,000 to 400,000 g/mol.

12. The multimodal polyethylene composition according to claim 7, wherein the multimodal polyethylene composition has a number average molecular weight from 8,000 to 25,000 g/mol, measured by Gel Permeation Chromatography.

13. The multimodal polyethylene composition according to claim 7, wherein the multimodal polyethylene composition has a Z average molecular weight from 1,000,000 to 5,000,000 g/mol, measured by Gel Permeation Chromatography.

14. The multimodal polyethylene composition according to claim 7 wherein the multimodal polyethylene composition has a density from 0.940 to 0.966 g/cm$^3$, according to ASTM D 1505 and/or $MI_5$ from 0.01 to 7 g/10 min, and/or $MI_{21}$ from 0.2 to 130 g/10 min.

15. A container comprising the multimodal polyethylene composition according to claim 7.

16. The container according to claim 15, obtained by blow molding, sheet forming or thermoforming.

17. The container according to claim 15, wherein the container has a volumetric capacity of 0.25 L to 40 L.

18. The container according to claim 15, wherein the container has a volumetric capacity of 40 L to 500 L.

19. The container according to claim 15, wherein the container has a volumetric capacity of 500 L to 2,000 L.

20. A multimodal polyethylene composition comprising:
(A) 40 to 65 parts by weight of a low molecular weight polyethylene having a weight average molecular weight (Mw) of 20,000 to 90,000 g/mol;
(B) 10 to 40 parts by weight of a first high molecular weight polyethylene having a weight average molecular weight (Mw) of more than 150,000 to 1,000,000 g/mol or a first ultra high molecular weight polyethylene having a weight average molecular weight (Mw) of more than 1,000,000 to 5,000,000 g/mol; and
(C) 10 to 50 parts by weight of a second high molecular weight polyethylene having a weight average molecular weight (Mw) of more than 150,000 to 1,000,000 g/mol or a second ultra high molecular weight polyethylene having a weight average molecular weight (Mw) of more than 1,000,000 to 5,000,000 g/mol,
wherein the multimodal polyethylene composition has a swelling ratio at shear rate 1400 1/sec determined at temperature of 190° C. in a circular length 0.25 mm orifice die 2 mm diameter and entrance angle by 45° of at least 170%, and has a FNCT at 80° C., 3.5 MPa with the environment of 2% solution of 4-nonylphenyl-polyethylene glycol from 10 to 270 hours, and
wherein (A), (B), and (C) each have a different weight average molecular weight.

* * * * *